J. L. MOORE.
Horse-Power Machine.

No. 221,416. Patented Nov. 11, 1879.

Witnesses:
T. C. Brecht
John Lockie

Inventor:
James Leard Moore
By Wm. R. Singleton
Attorney.

UNITED STATES PATENT OFFICE.

JAMES L. MOORE, OF ANSON COUNTY, NORTH CAROLINA.

IMPROVEMENT IN HORSE-POWER MACHINES.

Specification forming part of Letters Patent No. 221,416, dated November 11, 1879; application filed June 5, 1879.

*To all whom it may concern:*

Be it known that I, JAMES L. MOORE, of the county of Anson and State of North Carolina, have invented certain new and useful Improvements in Horse-Power Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in horse-power machines to be applied to gins or other machinery; and it consists in the arrangement of beveled and spur gearing, in combination with sprocket-wheels and chain-band, so that the speed is increased from the main driving or animal wheel to the counter-shaft pulley, from which the power is to be taken, all of which will be hereinafter more fully described, and set forth in the claim.

Figure 1:
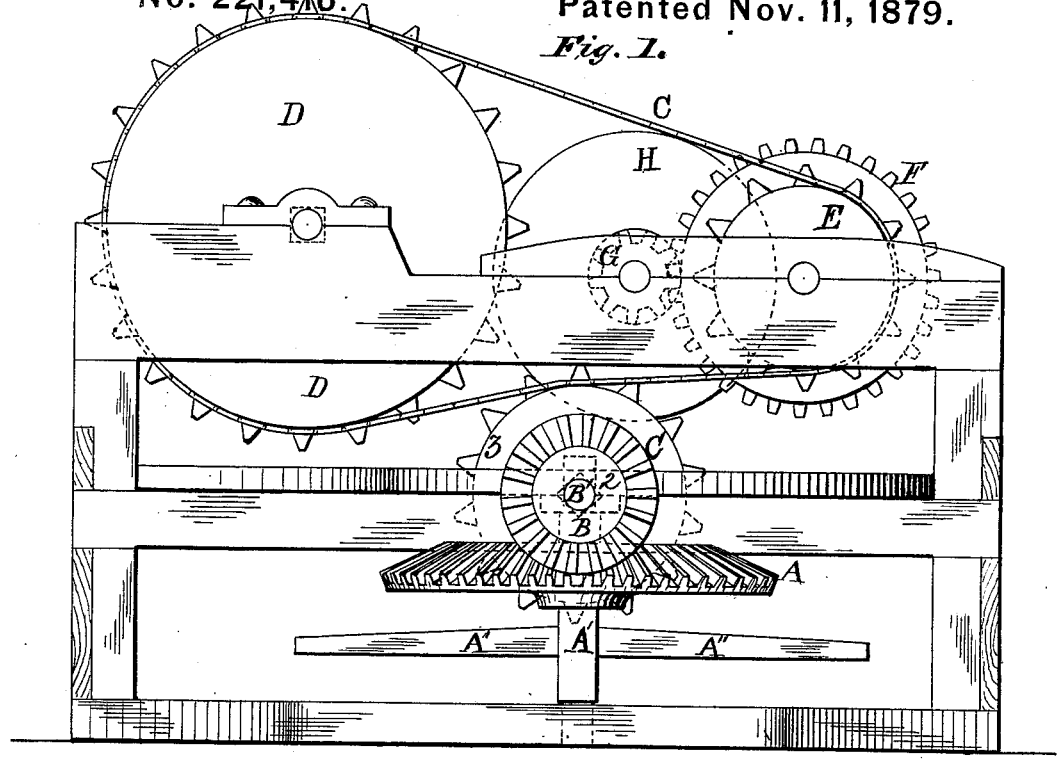
Figure 2:
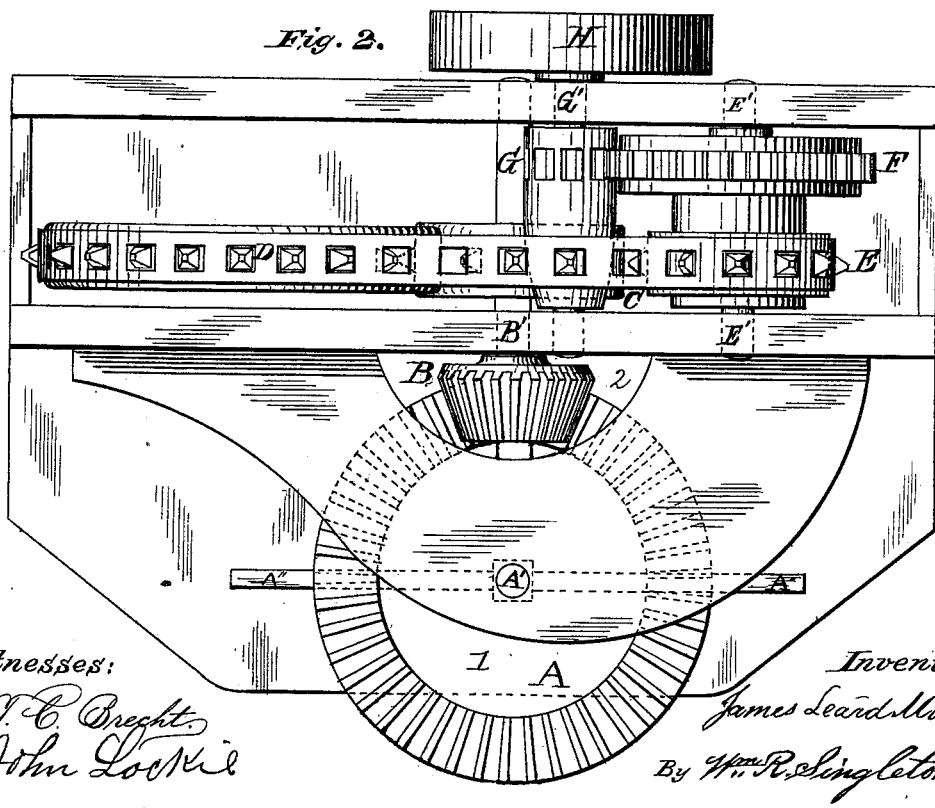

Figure 1 is a side elevation of the machine. Fig. 2 is a top or plan view.

The drawing represents the gearing of a gin-power running on the second floor of the gin-house, and the several parts will now be explained.

A is a main driving beveled wheel, fastened to a vertical shaft, A', through which are fastened the levers A'', for the horse or other animal. Geared with A is a beveled pinion, B, on a horizontal shaft, B', which is supported in the usual manner in the frame-work. On shaft B' is a sprocket-wheel, C, which, when revolving, carries an endless chain-band, C', which band also moves a large sprocket-wheel, D, by passing around it and also around a smaller sprocket-wheel, E, which is attached to the shaft E', on which is a spur-gear wheel, F, moving with wheel E and meshing with a pinion, G, on shaft G'. On the shaft G' is a pulley, H, from which power can be carried to the machine to be operated.

By this present arrangement of the number of cogs in the wheels A and B and the spur-gear F, and pinion G, the speed of the pulley H is increased eight times. Any other proportion may be obtained by the use of other numbers in the cogs of the different wheels.

I claim—

The combination of the beveled-gear wheels A and B, operated by a lever-shaft, A', the sprocket-wheels C D E, band-chain C', spur and pinion wheels F and G, and pulley H, all substantially as and for the purpose described.

In testimony that I claim the foregoing as my own I have hereunto set my hand this 28th day of May, 1879.

JAMES LEARD MOORE.

Witnesses:
R. B. GEDDY,
J. F. GRIFFIN.